No. 882,958. PATENTED MAR. 24, 1908.
H. PAULING.
PROCESS FOR MANUFACTURING NITRIC ACID BY MEANS
OF SUPERHEATING, &c.
APPLICATION FILED AUG. 12, 1902.
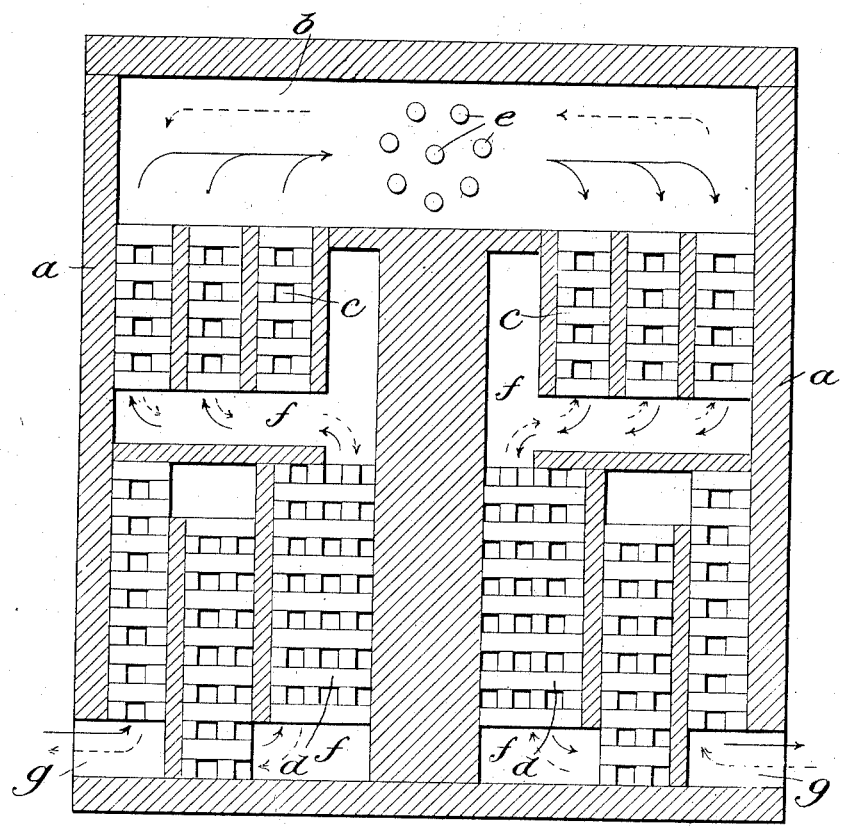
Witnesses:
C. H. Potter.
N. P. Leonard.
Inventor:
Harry Pauling,
by Rymer & Townsend,
Atty's.

UNITED STATES PATENT OFFICE.

HARRY PAULING, OF BRANDAU, AUSTRIA-HUNGARY, ASSIGNOR TO WESTDEUTSCHE THOMASPHOSPHAT-WERKE G. M. B. H., OF BERLIN, GERMANY.

PROCESS FOR MANUFACTURING NITRIC ACID BY MEANS OF SUPERHEATING, &c.

No. 882,958.     Specification of Letters Patent.     Patented March 24, 1908.

Application filed August 12, 1902. Serial No. 119,393.

*To all whom it may concern:*

Be it known that I, HARRY PAULING, director of mines, a citizen of the Kingdom of Saxony, and resident of Brandau, Bohemia, Austria-Hungary, (whose post-office address is house No. 200,) have invented certain new and useful Improvements in Processes for Manufacturing Nitric Acid by Means of Superheating, &c., of which the following is a specification.

My invention relates to a process for the manufacture of nitric acid from a moist mixture of nitrogen and oxygen, such, for instance, as atmospheric air. This is effected by heating the gas mixture up to the oxidation point of nitrogen in a suitable furnace, then repeatedly passing said mixture through regenerators and then introducing steam into the furnace, said steam taking part in the reaction.

When a mixture of nitrogen and oxygen is heated up to the temperature above named, the nitrogen as is well known by experience simply burns like any other gas mixed with oxygen and heated to the proper temperature. The product obtained may be converted into nitric acid by mixing it at a high temperature with steam.

Now the process of heating the gas mixture may be advantageously performed in a regenerating furnace provided with means for heating the mixture, which is repeatedly blown or sucked through said furnace in the usual manner by the aid of a chimney or a blower provided with suitable reversible valves. Of all the means for heating gases to a high temperature the electric arc is by far the most convenient. I have therefore constructed a regenerating furnace containing a heating chamber and one or more pairs of heat regenerators surrounding said chamber, the heating chamber containing one or more pairs of electrodes connected with a suitable source of electricity, to produce one or more electric arcs in said heating chamber.

The accompanying drawings show diagrammatically a furnace of this description.

Referring to said drawing *a* designates the wall of the furnace; *b* is the heating chamber; *d* and *c* are two pairs of heat regenerators. *e e* are the electrodes arranged in the heating chamber. *f f* are the channels conducting the gas mixture from the regenerators to the heating chamber and vice versa. *g g* are the openings for either introducing or extracting the gas mixture and for blowing and sucking said mixture through the regenerators and the heating chamber. Into this furnace, or one of any other suitable form, a current of air is blown or sucked, and after passing through one pair of regenerators the air will enter the heating chamber and in passing through the electric arcs formed between the electrodes arranged in said chamber will pass into the second pair of regenerators. Before the heated air has reached the corresponding opening of the furnace, the valves are reversed and the heated air now passes again through the heating chamber in an opposite direction. An increase of temperature will take place every time the current of air is reversed, and after a certain number of reversions the temperature within the heating chamber will rise to the oxidation-point of nitrogen. At this point the electric current may be interrupted and the electrodes projecting through the walls of the heating chamber pulled out so far that their points do not longer project into the chamber. Then an air current is blown or sucked through the furnace, and upon entering the first pair of regenerators takes up a certain amount of the heat stored in these regenerators. It then passes through the heating chamber into the second pair of regenerators, storing there part of the heat received, and, after reversing the valves, returning through the heating chamber into the first pair of regenerators, and so on, until all the nitrogen contained in this air has been burned. Now steam is blown into the furnace and the nitric acid formed is extracted. The heating chamber having by this time lost part of the heat accumulated in it, the electrodes are pushed back into it and after closing the circuit the electric arcs are formed as before, and the whole process is gone through again in the same manner.

It is evident that the above-described process may be carried out by the employment of other forms of apparatus than that herein shown and described.

What I claim as new is:

1. The process of oxidizing nitrogen, which consists in heating a gas-mixture containing nitrogen and oxygen to the oxidation-point of nitrogen, cooling said mixture and storing the heat, and transferring the stored heat to a fresh mixture of nitrogen and oxygen.

2. The process of manufacturing nitric acid, which consists in heating a gas-mixture containing nitrogen and oxygen to the oxidation-point of nitrogen, cooling said mixture and storing the heat, transferring the stored heat to a fresh mixture of nitrogen and oxygen, and adding steam to convert the gaseous product into nitric acid.

3. The process of oxidizing nitrogen, which consists in heating the surfaces of a plurality of refractory bodies to a high temperature, and heating a gas-mixture containing nitrogen and oxygen to the oxidation-point of nitrogen by bringing said mixture in contact with said heated surfaces, alternately.

4. The process of oxidizing nitrogen, which consists in heating a chamber to a high temperature, discontinuing the supply of heat, and introducing into said chamber a gas-mixture containing nitrogen and oxygen and thereby heating the mixture to the oxidation-point of nitrogen.

In testimony whereof I affix my signature in presence of two witnesses.

HARRY PAULING.

Witnesses:
   HENRY HASPER,
   WOLDEMAR HAUPT.